United States Patent

[11] 3,590,171

| [72] | Inventor | Carl M. Harrington<br>Columbus, Ohio |
|---|---|---|
| [21] | Appl. No | 789,134 |
| [22] | Filed | Jan. 6, 1969 |
| [45] | Patented | June 29, 1971 |
| [73] | Assignee | Jeffrey Galion Inc. |

[54] ROTARY CURRENT COLLECTOR
4 Claims, 4 Drawing Figs.

| [52] | U.S. Cl. | 191/12.2 |
|---|---|---|
| [51] | Int. Cl. | H02g 11/02 |
| [50] | Field of Search | 191/12.2, 12.4, 12.2 A |

[56] References Cited
UNITED STATES PATENTS

| 2,074,305 | 3/1937 | Tornblom | 191/12.2 |
| 2,450,257 | 9/1948 | Simmons | 191/12.2 X |
| 2,636,066 | 4/1953 | Sciaky | 191/12.2 (A) (UX) |

*Primary Examiner*—Arthur L. LaPoint
*Assistant Examiner*—George H. Libman
*Attorney*—David Young

ABSTRACT: A rotary current collector enclosed in a sealed housing, which is secured to a fixed part of the equipment. A rotating member of the current collector extends out through the fixed member of the current collector, with a bearing to rotatably support the rotating member. A cable reel is secured to the rotating member and is supported for rotation with the latter.

INVENTOR;
CARL M. HARRINGTON,
BY
David Young
ATTORNEY.

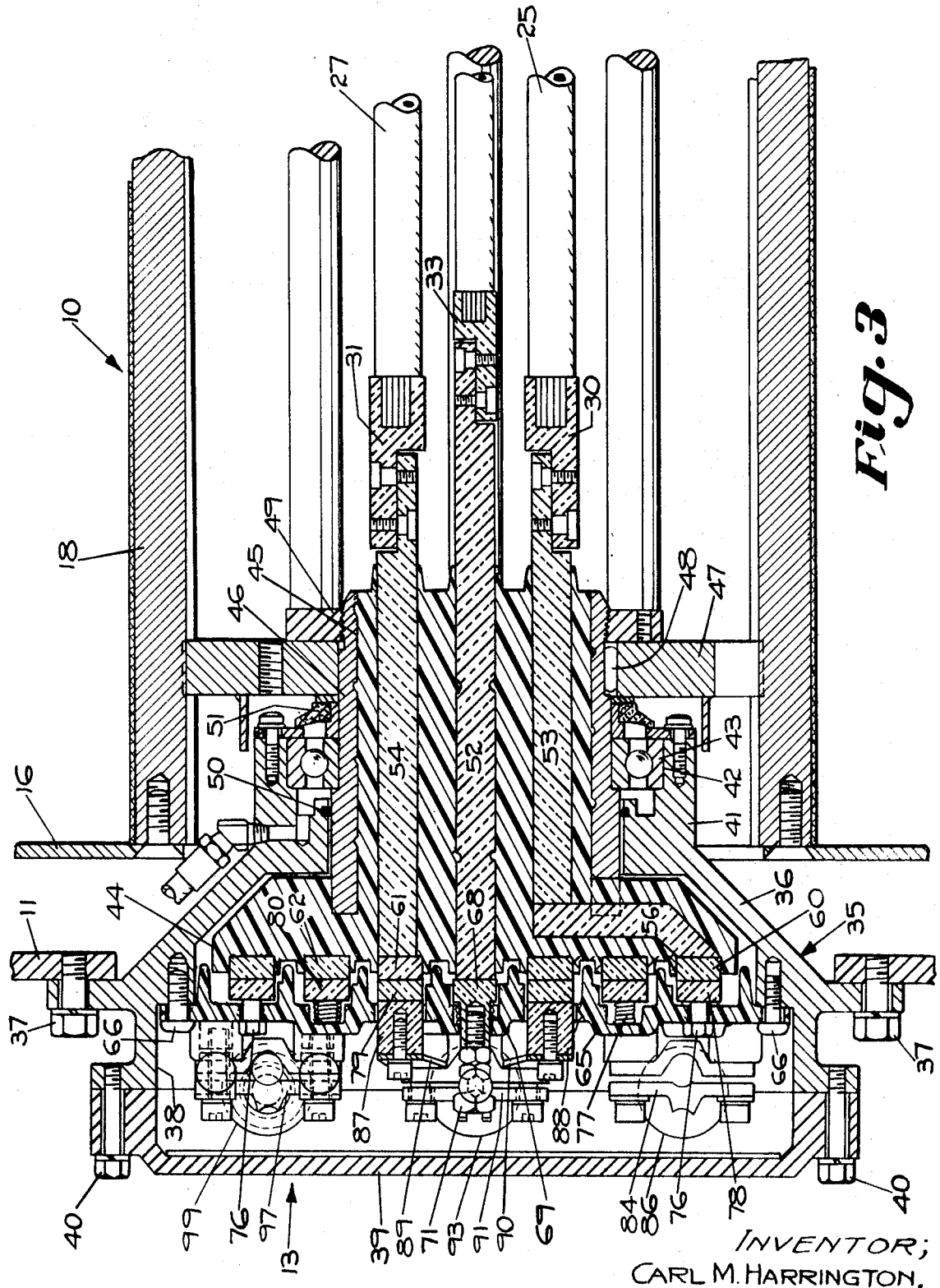

ROTARY CURRENT COLLECTOR

The instant invention relates to rotary current collectors for conducting electrical current from a rotating part to a fixed part, as in electrically powered equipment.

In electrically powered mobile equipment, one system for delivering current is to provide a cable reel on which there is stored a substantial length of cable that is connected to the electrical source. As the mobile equipment moves away from the source, the cable is reeled out from the cable reel, and as the mobile equipment moves towards the source the cable is reeled in on the reel. The cable reel is connected to the drive system of the equipment so that the rotation of the reel is related to the movement of the equipment and the length of cable that is reeled out or reeled in is equal to the distance traveled by the equipment in either direction.

A rotary current collector provides electrical connection between the cable on the rotating cable reel and the electrical system with the fixed electrical elements in the equipment. The rotary current collector has previously been placed within the cable reel, for example, as illustrated in the earlier patent to C. M. Harrington, Pat. No. 3,032,616, May 1, 1962. Such arrangement is advantageous to utilize the space within the cable reel for the current collector and provides a compact construction. However, the current collector is limited by the availability of space within the cable reel. Also, the accessibility of the current collector is somewhat dependent on the disposition of the cable reel.

There is a trend to develop mobile equipment capable of higher levels of performance with higher power demands in order to achieve the higher performance. In such equipment the electrical system, including the current collector, must be increased in size in order to handle the higher currents which are necessitated by the increased power of the equipment. When the current collector is placed within the cable reel, there is a limitation on the size of such current collector, since it must be related to the size of the cable reel. Such current collector cannot be increased in size to handle the higher levels of current, since it is limited by the availability of space in the cable reel.

The current collector of this invention is removed from within the cable reel and is placed at one end of the cable reel and is secured to a fixed part of the equipment. The current collector opens outwardly of the equipment to be easily accessible for maintenance and service, and extends inwardly to an end of the cable reel to support the latter on a rotating part of the current collector. The other end of the cable reel is rotatably supported on a fixed part of the equipment. The cable on the reel is electrically connected to the rotating part of the current collector, the latter being fixed relatively to the cable reel.

It is an object of this invention to provide an improved current collector for higher currents to supply increased power requirements in electrically powered equipment.

It is another object to provide an improved current collector which is secured to a fixed part of the equipment.

It is a further object to provide an improved current collector which is placed on a fixed part of the equipment to provide convenient access for service and maintenance of the current collector.

It is also an object to provide an improved current collector with a rotating part that extends inwardly to support a cable reel or other rotating unit.

It is still another object to provide an improved current collector which is enclosed in a sealed housing that is supported on a fixed part of the equipment.

It is still a further object to provide an improved current collector with a rotating member and a fixed member, in which the rotating member extends through the fixed member, with a bearing to rotatably support the rotating member on the fixed member.

Other objects of the invention will appear hereinafter, the novel features and combinations being set forth in the appended claims.

Referring to the drawings,

FIG. 3 is an enlarged sectional view of the current collector, similar to FIG. 1.

Figure 1:
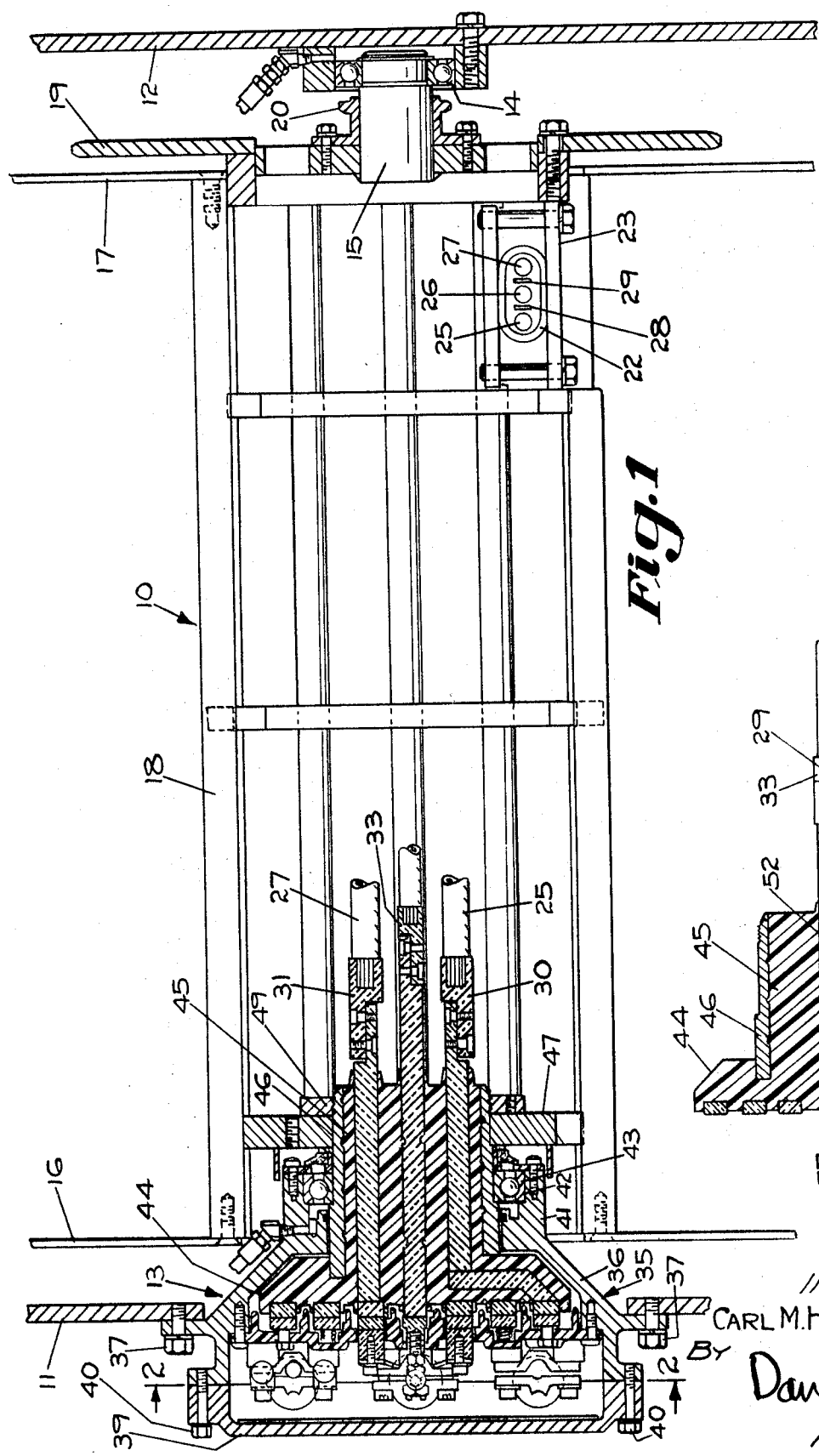
FIG. 1 is a sectional view of the current collector and a cable reel with which the current collector is used.

Referring to FIG. 1, there is illustrated a cable reel 10, which may be in a unit of electrically powered mobile equipment comprising opposite side plates 11,12. The side plates 11,12 are fixed structure of the equipment. A current collector 13 is secured to the side plate 11, and the one adjacent end of the cable reel 10 is secured to the current collector 13 for rotation relatively to the side plate 11, as will be described in detail below. The other end of the cable reel 10, adjacent the side plate 12, is rotatably supported on the latter by a bearing 14 which engages a short shaft 15 of the cable reel 10.

The ends of the cable reel 10 have radial flanges 16,17 for containing the cable on the drum part 18, which supports the cable. A sprocket 19 is secured to the cable reel 10 and is connected to the drive system of the mobile equipment for rotating the cable reel 10 in relation to the movement of the equipment, such that the length of cable that is reeled in or out is equal to the distance traveled by the mobile equipment. Another smaller sprocket 20 is connected to a spooling device to synchronously drive the latter, winding the cable on or off the drum 18 from one end to the other end. The inner end of cable 22 is secured to cable reel 10 by a clamp 23, from which point the cable 22 is wound on the drum 18 in the customary manner.

Figure 4:
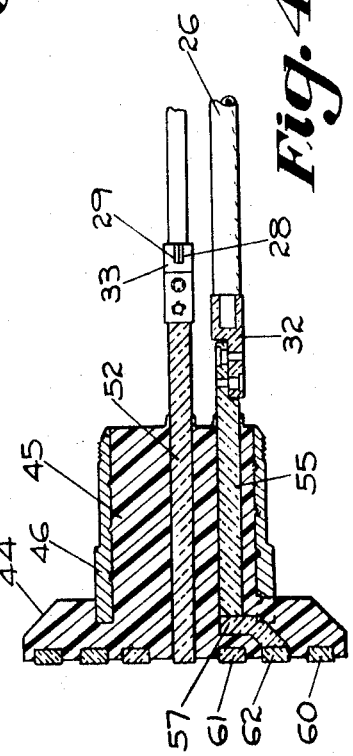
FIG. 4 is a sectional view of the rotating member of the current collector in another position.

As illustrated in FIG. 1, the cable 22 has three conductor elements 25, 26, 27 and two ground elements 28,29. Such three-conductor cable 22 is for alternating current. In equipment that is operated by direct current, a two-conductor cable is used. The conductor 25 is attached to a connector part 30 and is led from the clamp 23 through the inside of the drum 18 to the current collector 13. The conductor 27 is similarly attached to a connector part 31, and the conductor 26 is similarly attached to a connector part 32, as seen in FIG. 4. The ground elements 28,29 are attached to a connector part 33 and led through the inside of the drum to the current collector 13.

The current collector 13 has a housing 35 with a fixed member 36 secured to the side plate 11 by several cap screws 37. The fixed member 36 of the housing 35 opens outwardly of side plate 11 to provide a large access opening 38 for access to the elements contained within housing 35. A cover 39 is secured to the fixed member 36 by several cap screws 40 to close and seal the opening 38. The fixed member 36 and cover 39 are formed of metal for rigidity and strength.

The fixed member 36 extends inwardly of the side plate 11 with a hub 41 that provides a seat 42 for bearing 43. A rotating member 44 of the current collector 13 has a barrel 45 that extends through the hub 41 of fixed member 36. The rotating member 44 is formed of electrically nonconductive material to provide insulation for several electrical conductors in rotating member 44. The barrel 45 has a metal sleeve 46 secured on the barrel 45 by molding barrel 45 within the sleeve 46. The metal sleeve 46 is engaged with the inner race of bearing 43 to support rotating member 44 on the fixed member 36 for rotation relatively to the latter. An O-ring seal 50 is between hub 41 and sleeve 46, and an excluder seal 51 on sleeve 46 abuts the end of hub 41 beyond bearing 43 to seal the rotating junction of the fixed member 36 and the rotating member 44.

The end of the cable reel 10 adjacent to side plate 11 is secured to rotating member 44 of the current collector 13. The drum 18 includes a disc 47 which is placed on the metal sleeve 46 with a key 48, and secured by a threaded locking ring 49. This construction effectively supports the one end of the cable reel 10 on current collector 13 by means of the bearing 43 that is engaged with and secured to each of the fixed member 36 and the metal sleeve 46 on the barrel 45 of the rotating member 44.

The connector part 33 is connected to a ground conductor 52 that is disposed on the axis of the barrel 45. The connector part 30 is connected to a conductor 53, the connector part 31 is connected to a conductor 54, and the connector part 32 is connected to a conductor 55, as seen in FIGS. 3 and 4. The several conductors 53, 54, 55 are in the barrel 45 at circumferentially spaced positions around the ground conductor 53.

Conductor 53 is connected to a radially disposed conductor 56, and conductor 55 is connected to a radially disposed conductor 57. The conductor 56 is connected to an outer current collector ring 60, the conductor 54 is connected to an inner current collector ring 61, and the conductor 57 is connected to an intermediate current collector ring 62. The several current collector rings 60, 61, 62 are concentrically disposed at radially spaced positions around the axis of the barrel 45 and the ground conductor 52. The several conductors and current collector rings are all fixedly secured to the rotating member 44, which is accomplished by molding the material of the rotating member 44 around these several conductor elements. Such material may be a polyester plastic, which is electrically nonconductive, and is particularly suitable for this application.

There is a support 65 secured to the fixed member 36 by several cap screws 66. The support is formed of electrically nonconductive material, which may be a polyester plastic, so as to be electrically insulating.

Figure 2:
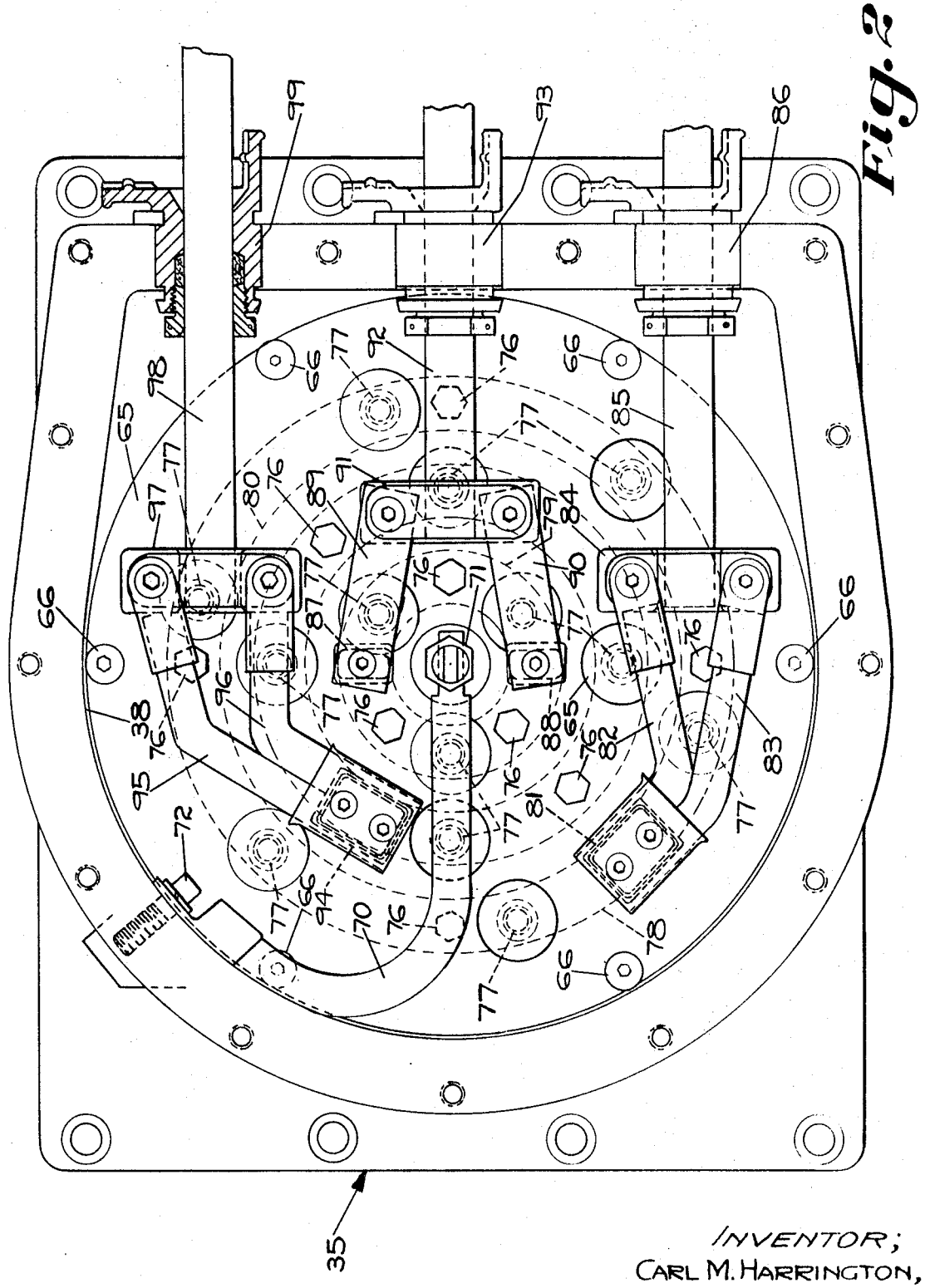
FIG. 2 is a view of the current collector taken on the line 2—2 in FIG. 1.

A fixed ground conductor 68 is held by the support 65 opposite the ground conductor 52 and in abutting disposition to the latter. A spring 69 is between the support 65 and the ground conductor 68 to press the latter against the ground conductor 52 to maintain electrical contact. A ground lead 70 is secured to the ground conductor 68 by a nut 71, and the other end of the ground lead 70 is connected to the fixed member 36 by a cap screw 72, thereby making connection to the side plate 11 and the frame of the equipment, as seen in FIG. 2.

An outer fixed current collector ring 78 is held by the support 65 opposite the current collector ring 60 in abutting disposition to the latter. The current collector ring 78 is held on the support 65 by several cap screws 76, which extend freely through support 65 and are threaded into ring 78. The cap screws 76 are preferably made of nylon so as to be insulating. Several springs 77 are disposed between support 65 and current collector ring 78 to press the latter against current collector ring 70 to maintain electrical contact.

An inner fixed current collector ring 79 is disposed opposite current collector ring 61 in abutting disposition, and an intermediate fixed current collector ring 80 is disposed opposite current collector ring 62 in abutting disposition. Each of current collector rings 79, 80 is held on support 65 by several cap screws 76, which are preferably of nylon, to be insulating, and there are several springs 77, disposed between support 65 and each of the current collector rings 79, 80, to press these against current collector rings 61,62, respectively, to maintain electrical contact. The current collector rings 78, 79, 80 are fixed with the fixed member 36, and the several current collector rings 60, 61, 62 are rotatable relatively to the fixed current collector rings with the rotatable member 44.

A post 81 is connected to the outer current collector ring 78, and flexible leads 82, 83 are connected to the post 81 and extend to the clamp 84. Electrical lead 85 is secured by clamp 84 and extends out of the housing 35 through a packing element 86. Posts 87,88 are connected to the inner current collector ring 79, and flexible leads 89,90 extend from the posts 87,88, respectively, to an electrical clamp 91. Electrical lead 92 is secured by the clamp 91 and extends out of the housing 35 through a packing element 93. A post 94 is connected to the intermediate current collector ring 80, and flexible leads 95,96 are connected to the post 94 and extend to the electrical clamp 97. Electrical lead 98 is secured by the electrical clamp 97 and extends out of the housing 35 through a packing element 99. The several electrical leads 85, 92, 98 extend from the current collector housing 35 to the electrical system of the electrically powered equipment.

As described herein the rotary current collector 35 is secured to the side plate 11 of the mobile equipment, which may be part of the fixed frame structure. The current collector is readily accessible for service and maintenance, and may be made of such size as to accept the current for the power requirements of the equipment. The rotating part of the current collector extends inwardly to the cable reel which is secured to such rotating part and supported for rotation.

Obviously those skilled in the art may make various changes in the details and arrangements of parts without departing from the spirit and scope of the invention, and applicant therefore wishes not to be restricted to the precise construction herein disclosed.

Having thus described and shown an embodiment of the invention, what it is desired to secured by Letters Patent of the United States is:

What I claim is:

1. A current collector for a cable reel in a fixed structure, said current collector being disposed at one end of said cable reel, means to rotatably mount the other end of said cable reel on said fixed structure, a fixed housing member in said current collector, means to secure said current collector to said fixed structure by said fixed housing member, relatively rotatable current collector rings in said current collector and disposed within said fixed housing member, said current collector including a rotatable element that extends in to said one end of the cable reel, means to secure said one end of said cable reel to said rotatable element for rotation of the cable reel with the rotatable element, said fixed housing member extending from said fixed structure in to said one end of said cable reel, bearing means in said one end of said cable reel between said fixed housing member of said current collector and said rotatable element of the current collector to rotatably support said one end of the cable reel on the fixed housing member.

2. A current collector as recited in claim 1, an opening in said fixed housing member outside of said fixed structure to provide access to the inside of the current collector, a cover for said fixed housing member opening, means to secure said cover to said fixed housing member outside of said fixed structure.

3. A current collector as recited in claim 1, one of said current collector rings being secured to said fixed housing member, another of said current collector rings being secured to said rotatable element, said rotatable element extending through said fixed housing member in to said cable reel, said fixed housing member is of metal material, said rotatable element is of electrically nonconductive material, a metal sleeve on said rotatable element and extending through said fixed housing member, said bearing means being engaged with said fixed housing member and with said metal sleeve of the rotatable element, and said cable reel is secured to said rotatable element on the metal sleeve.

4. A current collector as recited in claim 3, said rotatable element is formed with a barrel to which said sleeve is secured, a lead conductor in said rotatable element connected to said other current collector ring, a ground conductor in said rotatable element, ground connections in said fixed housing member to said ground conductor, each of said lead conductor and said ground conductor extending through said barrel in an axial direction.